W. H. Bennett.
Culinary Vessel.
Nº 73568. Patented Jan. 21, 1868.
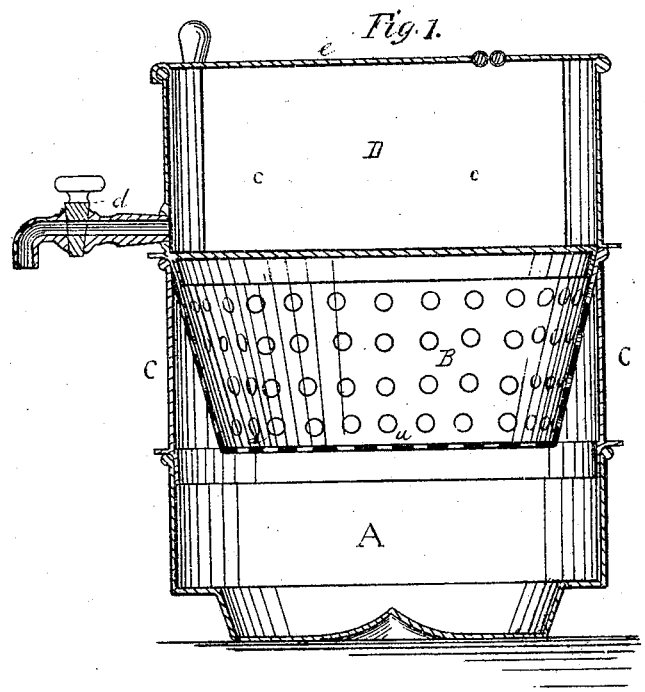
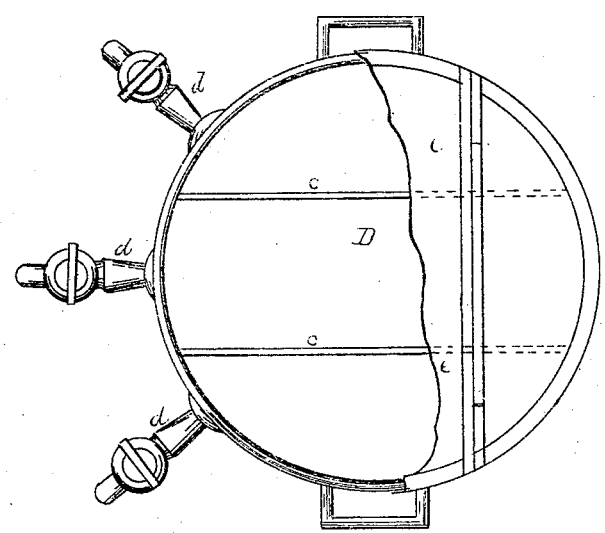
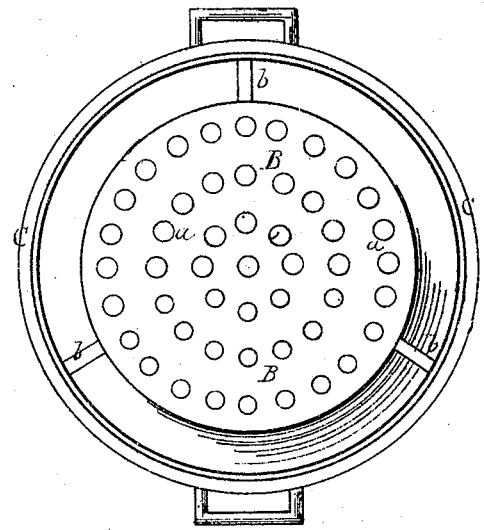
Witnesses:
Theo Tasche
J. A. Fraser
Inventor:
W. H. Bennett
Per Munn & Co.
Attorneys

United States Patent Office.

W. H. BENNETT, OF NEW YORK, N. Y.

Letters Patent No. 73,568, dated January 21, 1868.

---

IMPROVEMENT IN CULINARY VESSELS.

---

*The Schedule referred to in these Letters Patent and making part of the same.*

---

TO ALL WHOM IT MAY CONCERN:

Be it known that I, W. H. BENNETT, of the city, county, and State of New York, have invented a new and useful Improvement in Culinary Vessels; and I do hereby declare that the following is a full, clear, and exact description thereof, which will enable others skilled in the art to make and use the same, reference being had to the accompanying drawings, forming part of this specification, in which—

Figure 1 represents a vertical sectional view of my invention.

Figure 2 represents a plan or top view, partly in section, of the same.

Figure 3 is an inverted plan view of the inner perforated receptacle.

Similar letters of reference indicate corresponding parts.

This invention relates to certain improvements on the cooking-apparatus for which Letters Patent, No. 47,675, were granted to John Zimmermann, on the 9th day of May, 1865.

The invention consists in discontinuing the perforated bottom of the inner vessel, so that it may not reach beyond the perforated inner wall of the vessel, to permit the space between the perforated inner and the outer walls of the vessel to be cleaned.

In the apparatus invented by Zimmermann, the perforated bottom reached to the outer wall of the vessel, and thereby closed the lower end of the annular space formed between the two walls of the vessel. The said space could not be thoroughly cleaned, and impurities soon accumulated therein, making the whole vessel useless.

The invention also consists in combining with the cooking-vessel, and with the perforated vessel, an upper vessel, which is, by means of vertical partitions, divided into a number of compartments for containing different kinds of liquids, such as tea, coffee, milk, &c. By the addition of this vessel the apparatus is perfected as a universal cooking-device.

A represents the hot-water vessel, which rests upon the stove as described in the aforesaid Letters Patent. B is the perforated vessel, enclosed by a sheet-metal casing, C, as shown, and as described in the aforesaid Letters Patent. The bottom, $a$, of the vessel B does not reach to the side of the case C, as in the aforesaid Letters Patent, but ends at the outside of the sides of the vessel B, as shown, so that the space left between the sides of B and C may be left open at the under side to allow the insertion of a brush or cloth for cleaning purposes. If desired, the braces $b\ b$ may be used to connect the sides of the vessels B and C, as shown in fig. 3; but these braces may be omitted. D is a vessel, set above the vessel B, and resting upon the same, being of similar outer shape and material. The vessel D is divided into a number of compartments by means of vertical partitions $c\ c$, as shown, each compartment having its own faucet, $d$, for drawing off the liquid contents, and each having its separate cover, or all having one cover, $e$, as may be desired.

Having thus described my invention, what I claim as new, and desire to secure by Letters Patent, is—

The combination of the vessel D, divided into various compartments by the vertical partitions $c$, each compartment having its own tap, the perforated receptacle B leaving the space between its sides and the outer casing C open, and widest at the bottom, and the hot-water vessel A, all arranged as described for the purpose specified.

W. H. BENNETT.

Witnesses:
WM. F. MCNAMARA,
ALEX. F. ROBERTS.